Aug. 23, 1960 C. G. GERBITZ ET AL 2,950,439
TEST APPARATUS FOR CRYSTAL DIODES
Filed Dec. 5, 1957
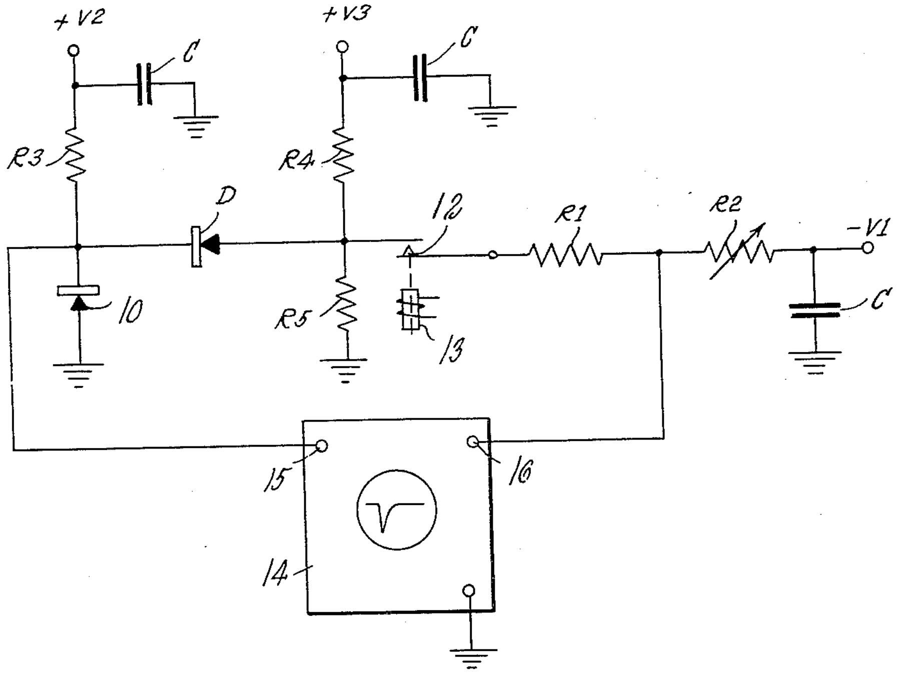
Inventors
Clarence G. Gerbitz
Norman H. Decker
by Edgar H. Kent Atty.

United States Patent Office 2,950,439

Patented Aug. 23, 1960

2,950,439

TEST APPARATUS FOR CRYSTAL DIODES

Clarence G. Gerbitz, Highland, and Norman H. Decker, Rhinebeck, N.Y., assignors to International Business Machines Corporation, New York, N.Y., a corporation of New York Filed Dec. 5, 1957, Ser. No. 700,815

5 Claims. (Cl. 324—158)

This invention relates generally to the testing of crystal diodes and in particular it relates to apparatus for measuring a transient response characteristic of crystal diodes.

In view of the many applications of crystal diodes involving rapid switching from a conductive to a non-conductive state, one of the diode characteristics that it is often desirable to determine is the reverse recovery characteristic; that is, the rate at which a diode assumes a quiescent high impedance state under the influence of an applied reverse bias voltage when it has been in an initial conductive state. Although conventional equipment is available to make this kind of measurement, it has been found that such equipment is unsuited to the measurement of very fast recovery times which many present day circuits demand. In particular, recovery times of less than 50-milli-microseconds ($5 \times 10^{-8}$ sec.), as are now required in the digital computer field, cannot be measured accurately because of stray capacitance in the measuring circuitry. This capacitance becomes excessive under high speed conditions and prevents a diode voltage from being built up rapidly enough to provide an indication of the desired characteristic.

It is an object of the present invention, therefore, to provide apparatus to measure the reverse recovery characteristic of crystal diodes exhibiting relatively fast recovery times.

The novel features of the invention together with further objects and advantages thereof will become apparent from the following description of a preferred embodiment of the invention wherein reference will be had to the accompanying drawing.

In the drawing the preferred embodiment of the apparatus according to the present invention is illustrated in schematic form.

With reference now to the drawing, it will be observed that there is connected to the diode under test, which has been designated by the numeral 10, a second diode D which is especially adapted to be operated under zener breakdown conditions. As shown, the diodes 10 and D are connected in series opposing relation, that is they have a common cathode connection, and the anode of the test diode 10 is connected to a common point or ground. Connected to the anode of zener diode D through a suitable switching device 12 is a forward biasing circuit including a source of forward biasing potential V1, and a pair of resistors R1 and R2. Resistors R1 and R2 are connected in series between the switching device 12 and the source V1 which is seen to be negative with respect to ground. Switching device 12 preferably comprises a fast-acting mercury switch which is adapted to be relay actuated by means of a coil 13.

Toward the left of the drawing it will be observed there is another potential source V2 which serves to furnish a reverse bias potential to the diode 10. Source V2 has a relatively positive potential with respect to ground and is resistively coupled to the cathode junction of diodes 10 and D through a resistor R3. As will appear, diode 10 will be reverse biased only when the switch 12 is opened, thereby interrupting the flow of current through the diodes produced by the source V1. The zener diode is also adapted to be placed in a non-conductive reverse bias state when the switch 12 is opened, and to this end there is provided still a third source of biasing potential V3 having a relatively positive value. Source V3 is connected to ground through a pair of series resistors R4 and R5 and the junction of the resistors is connected to the anode of the zener diode. A capacitor C is also connected between the source V3 and ground to improve the voltage regulation thereof as is the case with sources V1 and V2.

To provide an indication of the reverse recovery characteristic of the test diode 10, there is shown by way of example an oscilloscope 14 having a beam deflecting input terminal 15 adapted to control the vertical deflection of the scope in response to an applied input voltage. Terminal 15 is connected to the cathode or ungrounded side of the test diode 10. Also of special significance according to the present invention is the input terminal to the horizontal sweep trigger circuit of the scope which has been designated 16. Terminal 16 is connected to the junction of resistors R1 and R2.

In operation it will be assumed first that the switch 12 is closed. In this case, the forward biasing source V1 will be effective to produce a current flow through the diodes which is in a forward direction with respect to the test diode 10, and in a reverse direction with respect to the zener diode D, the latter being operated in a zener breakdown condition. The amount of the current flow is limited by resistors R1 and R2. If the coil 13 now be energized, thereby opening the switch 12, the voltage on the anode side of the zener diode will be permitted to rise. By appropriate choice of the circuit constants involved, the new potential assumed by the anode of the zener diode can be made less negative with respect to its cathode so that zener breakdown is terminated, and yet sufficiently negative so that an appreciable reverse bias is present. When in such a reverse bias state, diode D has a relatively high impedance, with the result that any stray capacitance to ground which may be present on its anode side will be effectively decoupled from the test diode. This will permit the voltage on the test diode to build up under the influence of reverse bias source V2 in a manner which accurately reflects the recovery characteristic of the test diode.

As is apparent, the oscilloscope serves to display this build up or variation of the voltage across the diode in view of the connections that have been provided thereto. That is to say, the horizontal sweep generator of the scope is triggered by the sudden decrease in the voltage on terminal 16 when switch 13 is opened, and this initiates an appropriate horizontal deflection of the beam. The vertical deflection of the beam, on the other hand, is controlled by the diode voltage. Accordingly, there will be provided by the oscilloscope, a trace of the test diode voltage as a function of time from which the desired characteristic may be readily observed. In this regard, those skilled in the art will appreciate that with ordinary oscilloscopes, some convenient means of pulsing the relay coil 13 will be provided, alternately to open and close the switch and thereby successively reproduce the voltage trace on the scope.

The following is a list of circuit constants that have been found to work well in most applications of the measuring apparatus according to the present invention:

| | | |
|---|---|---|
| R1 | ohms | 100 |
| R2 | do | 250 |
| R3 | do | 1000 |
| R4 | do | 200 |

| | | |
|---|---|---|
| R5 | do | 1000 |
| V1 | volts | −30 |
| V2 | do | +10 |
| V3 | do | +9 |
| C | microfarads | 10 |
| D | | 1N438A |

The invention should not be deemed to be limited to this illustrative circuit in all its details, however, since various modifications that are within the spirit and scope of the invention will no doubt occur to those skilled in the art. Rather the invention should be deemed to be limited only by the scope of the appended claims.

What is claimed is:

1. Apparatus for measuring the reverse recovery characteristic of a crystal diode, said apparatus comprising a zener diode connected in series opposing relation to the diode under test, a forward biasing circuit to cause breakdown of the zener diode and produce a current flow in a forward direction with respect to the test diode and in a reverse direction with respect to the zener diode, a switching device coupling said forward biasing circuit across the series combination of said diodes so as to permit interruption of said current flow, a first reverse biasing circuit coupled to the test diode, said first reverse biasing circuit supplying a reverse bias potential to the test diode when said current flow is interrupted, a second reverse biasing circuit coupled to the zener diode, said second reverse biasing circuit supplying a reverse bias potential to the zener diode having a magnitude such that the zener diode is not subject to breakdown when said current flow is interrupted, and means to indicate the variation in the voltage across the test diode following the interruption of said current flow.

2. Apparatus according to claim 1 wherein said last-named means includes an oscilloscope having a beam deflecting input circuit connected to the test diode and a horizontal sweep trigger circuit connected to said forward biasing circuit.

3. Apparatus according to claim 1 wherein said forward biasing circuit includes a source of negative voltage and a resistance in series with the negative voltage source, and said first reverse biasing circuit includes a source of relatively positive voltage and a resistance in series with said positive voltage source and said test diode, said first-mentioned resistance having a substantially smaller value than said second-mentioned resistance.

4. Apparatus according to claim 1 wherein said second reverse biasing circuit includes a source of voltage having positive and negative terminals, and a pair of resistors connected between the zener diode and the respective positive and negative terminals of said source.

5. Apparatus for measuring the reverse recovery characteristic of a crystal diode, said apparatus comprising a zener diode connected in series opposing relation to the diode under test, a negative voltage source coupled to the series combination of said diodes to cause breakdown of the zener diode and produce a current flow in a forward direction with respect to the test diode and in a reverse direction with respect to the zener diode, a resistance in circuit between said source and the zener diode to limit the magnitude of said current flow, a switching device connected in series between said resistance and the zener diode so as to permit interruption of said current flow, a first positive voltage source resistively coupled to the test diode to supply a reverse bias potential thereto when said current flow is interrupted, a second positive voltage source, a resistive voltage dividing circuit coupling said second positive source to the zener diode to supply a reverse bias potential thereto having a magnitude such that the zener diode is not subject to breakdown when said current flow is interrupted, and means to indicate the variation in the voltage across the test diode following the interruption of said current flow.

References Cited in the file of this patent

UNITED STATES PATENTS

| | | |
|---|---|---|
| 2,697,814 | Grant et al. | Dec. 21, 1954 |
| 2,698,419 | Blair | Dec. 28, 1954 |
| 2,736,860 | Trousdale | Feb. 28, 1956 |
| 2,777,956 | Kretzmer | Jan. 15, 1957 |
| 2,812,451 | Curtis | Nov. 5, 1957 |
| 2,817,772 | Lee | Dec. 24, 1957 |

FOREIGN PATENTS

| | | |
|---|---|---|
| 573,959 | Great Britain | Dec. 14, 1945 |

OTHER REFERENCES

Firle et al.: "Recovery Time Meas. on Point-Contact Germanium Diodes," proceedings of the IRE, May 1955; pp. 603–607, volume 43, No. 5.